United States Patent
Lampert et al.

(10) Patent No.: US 7,645,313 B2
(45) Date of Patent: Jan. 12, 2010

(54) WOUND FILTER ELEMENT

(75) Inventors: Johannes Lampert, Remseck (DE);
Andreas Pelz, Markroeningen (DE);
Josef Rohrmeier, Laberweinting (DE);
Thomas Sieber, Marklkofen (DE);
Mario Rieger, Freiberg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 386 days.

(21) Appl. No.: 11/640,236

(22) Filed: Dec. 18, 2006

(65) Prior Publication Data
US 2007/0186527 A1    Aug. 16, 2007

(30) Foreign Application Priority Data
Dec. 19, 2005    (DE)    .................. 20 2005 019 909 U

(51) Int. Cl.
*B23K 31/00*    (2006.01)
*B23P 15/00*    (2006.01)
*B01D 46/00*    (2006.01)

(52) U.S. Cl. .................... 55/529; 55/385.3; 55/478; 55/479; 55/482; 55/486; 55/500; 55/502; 55/520; 55/DIG. 5; 228/130; 228/136; 228/145; 228/173.6; 29/896.62; 166/233; 166/236

(58) Field of Classification Search ............... 55/385.3, 55/478, 479, 482, 486, 500, 502, 529, 520, 55/DIG. 5; 228/130, 136, 145, 173.6; 29/896.62; 72/368, 497.1; 166/233, 236
See application file for complete search history.

(56) References Cited

U.S. PATENT DOCUMENTS

| | | | |
|---|---|---|---|
| 3,149,942 A * | 9/1964 | Finch | 55/495 |
| 3,222,140 A * | 12/1965 | Thorne-Thomsen et al. | 422/115 |
| 5,273,818 A * | 12/1993 | Kim et al. | 442/172 |
| 5,820,646 A | 10/1998 | Gillingham et al. | |
| 5,968,215 A * | 10/1999 | Webb | 55/385.3 |
| 7,287,684 B2 * | 10/2007 | Blackburne, Jr. | 228/130 |
| 2006/0163150 A1 * | 7/2006 | Golden et al. | 210/493.1 |
| 2007/0137157 A1 * | 6/2007 | Linhart et al. | 55/486 |
| 2008/0010959 A1 * | 1/2008 | Gillingham et al. | 55/486 |
| 2008/0110142 A1 * | 5/2008 | Nelson et al. | 55/357 |
| 2008/0141638 A1 * | 6/2008 | Linhart et al. | 55/520 |

FOREIGN PATENT DOCUMENTS

EP      0 900 118 B1    3/1999
WO     WO 97/40917     11/1997

* cited by examiner

*Primary Examiner*—Duane Smith
*Assistant Examiner*—Minh-Chau T Pham
(74) *Attorney, Agent, or Firm*—Crowell & Moring LLP

(57) ABSTRACT

A filter element (1) wound from a plurality of filter layers in which the circumferential contour (5, 5') of a cross-sectional area (4) of the filter element (1) has at least one circumferential contour section (5') undercutting the envelope contour (6, 6') of the cross-sectional filter element area (4).

21 Claims, 2 Drawing Sheets

WOUND FILTER ELEMENT

BACKGROUND OF THE INVENTION

The present invention relates to a filter element wound from a plurality of filter layers.

Filter elements wound from paper layers are known, for example, from U.S. Pat. No. 5,820,646 (=EP 900,118), which discloses cylindrical filter elements having cross-sectional areas with a circular circumferential contour. This patent also discloses filter elements having a substantially rectangular circumferential contour, but the corners of the cross-sectional filter element area are rounded for manufacturing reasons. U.S. Pat. No. 5,820,646 additionally discloses the manufacture of filter elements having an oval circumferential contour. However, all the known filter elements have in common that they have a positive, outwardly curved or convex circumferential contour.

SUMMARY OF THE INVENTION

An object of the present invention is to provide an alternative configuration for a filter element that will broaden the potential range of application of filter elements.

A further object of the invention is to provide an apparatus and a method for manufacturing a filter element with such an alternative configuration.

These and other objects are attained in accordance with the present invention by providing a filter element wound from a plurality of filter layers, wherein the filter element has a cross-sectional area with a circumferential contour having at least one circumferential contour section which undercuts an envelope contour of the cross-sectional filter element area.

In accordance with a further aspect of the invention, the objects are achieved by providing an apparatus for producing a filter element wound from a plurality of filter layers, in which the filter element has a cross-sectional area with a circumferential contour having at least one circumferential contour section which undercuts an envelope contour of the cross-sectional filter element area, the apparatus comprising a holding device for a support core; a winding device for winding the filter material around the support core, and a pressure-exerting member for pressing the filter material at least in sections against the support core during winding of the filter material around the support core.

According to yet another aspect of the invention, the objects are achieved by providing a method for producing a filter element wound from a plurality of filter layers, in which the filter element has a circumferential contour with a cross-sectional area having at least one circumferential contour section which undercuts an envelope contour of the cross-sectional filter element area; the method comprising winding the filter layers around a support core, and pressing the filter layers against the support core at least in the region of the undercut circumferential contour section during the winding.

Advantageous further aspects and embodiments of the invention are described hereinafter.

The idea underlying the invention is that columnar filter elements typically have a circumferential contour that differs from the envelope contour of the filter element cross-section, such that the circumferential contour includes at least one constricted area. In other words, a portion of the circumferential contour of a cross-sectional area of the filter element is negatively or inwardly curved. Thus, the circumferential contour according to the invention has a concave, i.e., an inwardly curved, circumferential contour section, and the envelope contour is not the actual circumferential contour of a filter element cross section. The envelope contour is obtained by stretching a flexible element, such as a piece of string, around the filter element. The course of the string then corresponds to the envelope contour. Undercuts are recessed from the envelope contour with rectilinear sections. For example, in a circle, the envelope contour is the circumferential contour of the circle.

In accordance with the present invention, the actual circumferential contour of the cross-sectional area of the filter element differs from its envelope contour and undercuts it, i.e., has a negative or concave circumferential contour section as described above. This negative contour region can serve as an inflow or compression chamber for the medium to be filtered.

The filter element according to the invention, which has an inwardly curved circumferential contour section, cannot be manufactured using conventional production technology for manufacturing a filter element because the filter layers tend to adopt or follow the envelope contour of the filter element or a cross-section of the filter element. However, with the aid of the apparatus according to the invention, which will be explained below, and the method according to the invention, which also will be explained below, it is possible for the first time to produce the described alternative configuration.

The new configuration of the filter element according to the invention substantially broadens the field of application of wound filter elements, which are usually used as inline filters, because the filter element configured according to the invention can also be used in complexly shaped installation locations. The wound filter elements are usually cylindrical, i.e., they have an arbitrarily shaped cross-sectional area and a lateral surface which extends parallel to an imaginary straight line intersecting the cross-sectional area. The superimposed cross-sectional areas of the filter element are identically shaped. The filter elements according to the invention, however, are not limited to cylindrical shapes with identical cross-sectional filter element areas. It is conceivable, for example, that the filter elements are somehow wound in a columnar shape, e.g., with a hyperbolically shaped lateral surface.

For many possible fields of application of the filter element according to the invention it is advantageous if the envelope contour is symmetrical. In principle, this includes all possible symmetries. The envelope contour can, for example, be point symmetrical relative to a longitudinal center axis. The envelope contour of a cross-sectional area of a filter element can in addition, or as an alternative, be mirror symmetrical relative to a cross-sectional axis. A circular or oval envelope contour from which the actual circumferential contour of the filter element differs by at least one inwardly curved or constricted circumferential contour section has been found particularly advantageous.

Especially interesting from an application perspective is a circumferential contour that is banana-shaped or crescent-shaped. In this type of configuration of the circumferential contour, the concave circumferential contour section is relatively large compared to the convex circumferential contour section. As a rule, the associated envelope contour has a convex and a rectilinear circumferential section. Depending on the configuration of the banana or crescent shape, the envelope contour can be approximately oval.

A further option is to shape the envelope contour as a polygon, particularly with rounded corners. The associated circumferential contour of the filter element differs from the polygonal envelope contour by an inwardly curved circumferential contour section.

To produce the filter elements according to the invention, a support core is required onto which the filter layers are wound, particularly layers of filter paper. Advantageously, the shape of the circumferential contour of the support core corresponds at least substantially to the shape of the circumferential contour of the finished filter element. As a rule, the support core, in contrast to the finished filter element, has pointed corners. When the filter layers are wound around the support core, rounded corners result in the finished filter element.

To ensure that the filter layers are held together, one embodiment provides that at least two adjacent filter layers, and preferably all adjacent filter layers, are glued together. If the support core is intended to remain in the filter element, the filter layer adjacent the support core may also be glued to the support core. The adhesive is preferably applied in the form of at least one, preferably at least two tracks of adhesive. As a rule, it is sufficient if the tracks of adhesive are applied as a line rather than over a large area.

Another object of the invention, as mentioned above, is to provide an apparatus for producing a filter element according to the invention. This apparatus comprises a mounting clamp or other holding device for a support core and a winding device for winding the filter material around the support core. The support core must be rotatable relative to the winding device. This can be achieved by mounting either the support core or the winding device for rotation. It is also feasible to mount both the support core and the winding device for rotation relative to each other.

To produce known filter elements with an exclusively positive circumferential contour it is sufficient if the filter material being wound is held under a certain tension during the winding process, so that it uniformly applies itself against the support core in layers. Since the support core for producing a filter element according to the invention also has at least one negative circumferential contour section, the filter material would, in conventional winding apparatuses, apply itself against the envelope contour of the support core rather than follow the negative contour section. According to the invention, the apparatus for producing the filter element is provided with at least one pressure-exerting member to press the filter material against the support core, at least in sections, during the winding process. With the aid of the pressure-exerting member, the top layer of the filter material is pressed against the layers beneath it, so that the filter material follows the circumferential contour curve of the support core during the winding process, even in recessed or concave sections of the support core.

To ensure a permanent bond between the filter layers, at least one glue application device may be provided, which applies glue, particularly tracks of glue, to the filter layers.

In accordance with one embodiment of the invention the pressure-exerting member comprises at least one roller element that rolls along or over the top filter layer. As a rule, the support core rotates past the roller element, which is adjustable perpendicular to the support core. It is also feasible to fix the support core against rotation, so that the roller element, together with the winding device, revolves around the support core. It is important that the roller element can not only execute its rolling movement but also a relative movement perpendicular to the support core surface. This can of course also be achieved if the support core is movable perpendicularly to the roller element.

To press the roller element against the support core or against the previously wound filter layers, at least one spring member is provided, which applies a force biasing the roller element toward the support core.

In addition, or as an alternative to applying a spring force, a drive for the roller element may be provided to realize the perpendicular relative movement between the support core and the roller element. This drive is preferably associated with the roller element. It is also feasible, however, to use the drive to displace the support core. A piston-cylinder unit or an electromotive drive is particularly suitable for ensuring the perpendicular relative movement.

In one embodiment of the invention, a control unit is provided to control the drive. There are several options to control the relative movement between the roller element and the support member. It is possible, for example, to store the contour curve of the support core in a memory, so that the relative movement and the contact pressure are controlled as a function of the angle of rotation of the support core and the number of executed revolutions and/or the distance to the roller element. It is also feasible to detect the contour curve, preferably continuously, with a sensor and to use the measured contour curve and the relative position of the roller element and the support core for control. This relative position is also measured by a sensor and the measured information is supplied to the control unit. The control unit can be used to ensure that the pressure applied to the top layer by the roller element remains at least approximately constant.

Another object of the invention is to provide a production method. The production method is distinguished in that the filter layers are pressed against the support member during the winding process, at least in the region of the undercut circumferential contour section. A pressure-exerting member with a roller element is particularly suitable for this purpose.

As mentioned above, it is advantageous if at least two adjacent filter layers are glued together. To prevent warping of the finished wound and glued filter element when the adhesive cures, the invention provides that the finished wound filter element be transferred to an at least approximately rigid shell. It is advantageous in this connection if the inner contour of the shell corresponds to the circumferential contour of the finished wound filter element. It is also feasible, however, to configure the shell in such a way that the inner contour of the shell differs from the circumferential contour of the finished wound filter element to make it possible, for example, to correct or optimize the shape after completion of the winding process and before final curing of the adhesive.

If desired, the support core can be removed after the adhesive has cured. This reduces the weight of the filter element.

In accordance with another aspect of the invention, the contour of a cross-sectional area of a wound filter element may be different from the circumferential contour of a circle, an oval or a rectangle with rounded corners. The envelope contour can correspond to the circumferential contour, or the circumferential contour can undercut the envelope contour. In one embodiment of the invention, the circumferential contour of a cross-sectional area of a typically cylindrical filter element has a triangular configuration, particularly with rounded corners. An equal-sided triangular shape of the circumferential contour of the cross-sectional area of the filter element is particularly suitable. By placing, for example, two triangular filter elements side by side, a rectangular filter element can be obtained. In a particularly advantageous embodiment of the invention, the circumferential contour of a cross-sectional area of the filter element is honeycomb-shaped. Placing a plurality of honeycomb-shaped filter elements side by side makes it possible to produce a modular filter element of almost any shape desired. An advantageous aspect of the invention is that a support core having a circumferential contour that corresponds at least approximately to the circumferential contour of the finished wound filter element is used to produce such filter elements.

Additional advantages and desirable embodiments are set forth in the following description and/or the drawings.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
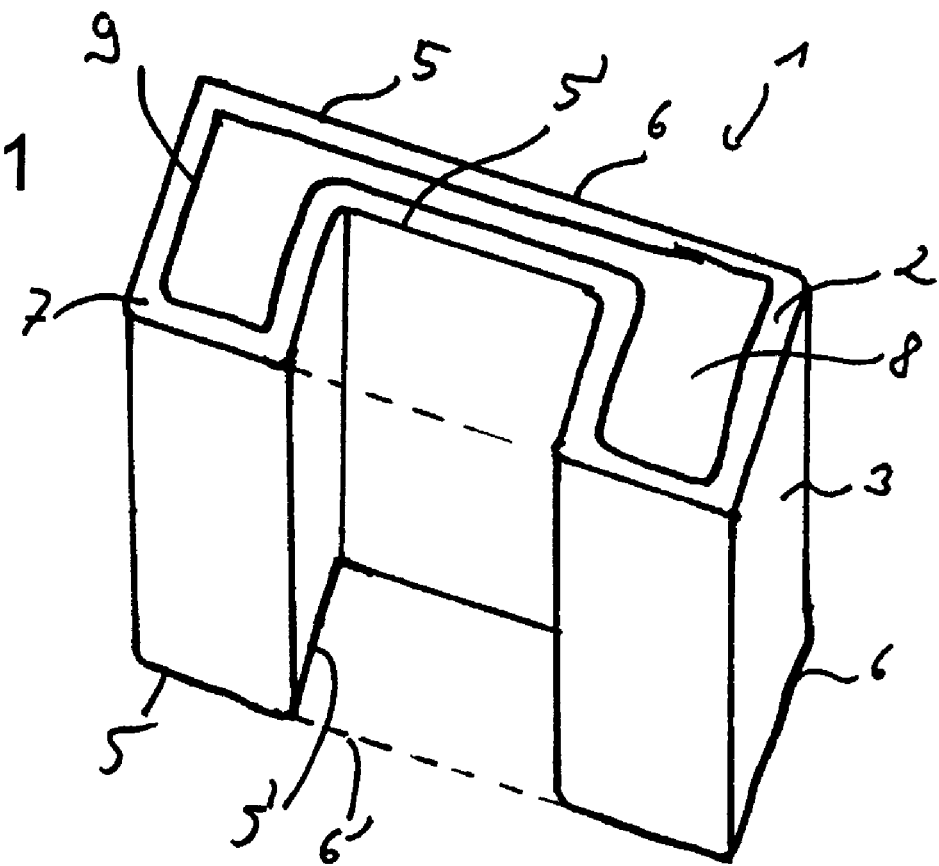
FIG. 1 is a perspective view of a filter element wound around a support core having a substantially rectangular envelope contour and a circumferential contour drawn inwardly in one region relative to the envelope contour.
Figure 2:
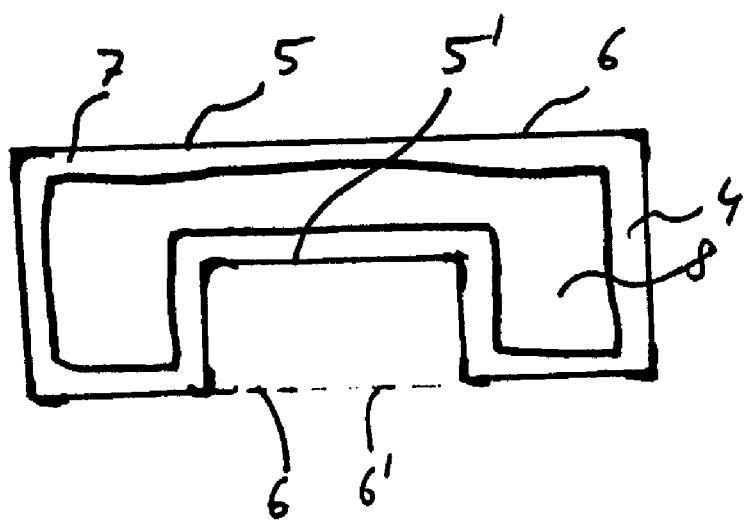
FIG. 2 is a cross-sectional view the filter element according to FIG. 1.

In the figures, like components and components with like function are identified by the same reference numerals. FIG. 1 shows a wound filter element 1. The illustrated cylindrical filter element has two spaced-apart base areas 2 interconnected by a lateral surface 3, which extends perpendicular thereto. The base areas 2 correspond to the cross-sectional filter element area 4 shown in FIG. 2. The circumferential contour 5 of the base areas 2 and the cross-sectional filter element area 4 are substantially U-shaped. In contrast, the envelope contour 6 of the filter element 1 is substantially rectangular. The circumferential contour section 5' of the circumferential contour 5 is curved inwardly relative to the envelope contour 6. In other words, the circumferential contour 5 undercuts the envelope contour 6 of the cross-sectional filter element area 4 in the circumferential contour section 5'. As a result, a filter element with a negative circumferential contour section 5' is obtained. The section 6' of the circumferential contour 6 indicated by the broken line extends in a straight line and is undercut by the circumferential contour section 5'.

A rigid support member 8 is located within the winding area of the filter element 1, which consists of a plurality of filter material layers 7. The circumferential contour 9 of the support member 8 corresponds substantially to the scaled-down circumferential contour 5 of the finished wound filter element 1.

Figure 3:
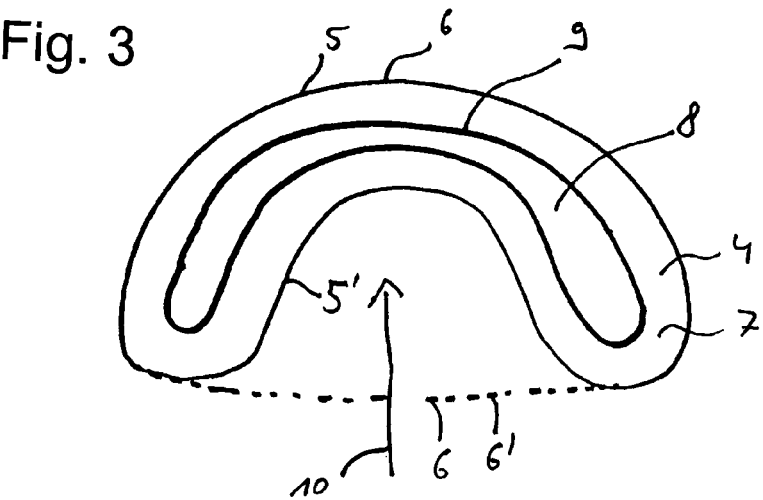
FIG. 3 is a cross-sectional view of a filter element with a banana-shaped circumferential contour and an envelope contour with a convex and a rectilinear contour section.

FIG. 3 shows a generally banana-shaped or crescent-shaped cross-sectional filter element area 4. In the concave region 5', the circumferential contour 5 of the cross-sectional filter element area 4 undercuts the envelope contour 6 of the cross-sectional filter element area 4, which in this region 6' is straight.

The circumferential contour 9 of the centrally disposed support member 8 is also banana-shaped. The arrow 10 indicates a possible inflow direction of the medium to be filtered, e.g., air. In the embodiment shown, the concave region 5' forms an inflow chamber for the inflowing fluid.

Figure 4:
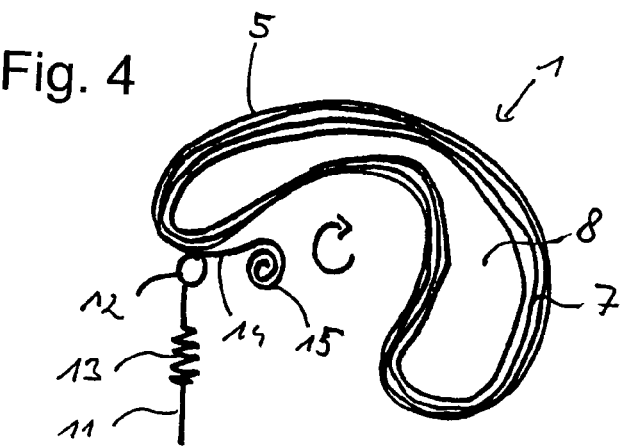
FIG. 4 illustrates an unfinished filter element during the winding process having a banana-shaped support core, in which a pressure-exerting member presses the top filter layer against the filter layers beneath it.

FIG. 4 schematically shows an apparatus for producing a filter element 1 with a central support core 8 and a multiple layers of filter material 7 wound onto this support core 8. The support core 8 is held by a holding device. The support core 8 is rotatable clockwise by means of the holding device as indicated by the circular arrow. The top filter layer 14 is pressed against the previously wound filter layers 7 by a pressure-exerting member 11 comprising a roller element 12, which is biased toward the rotating support core 8 by a spring 13. This ensures that the top filter layer 14 does not follow the envelope contour but is given a banana-shaped circumferential contour 5 corresponding to the shape of the support core 8. In the illustrative embodiment shown, the roller element 12 is movable relative to, and perpendicular to, the surface of the top filter layer 14. The top filter layer 14 is supplied by being unrolled from a supply roll 15 of filter material which is unwound from the supply roll and wound around the support core to form the filter element. In the embodiment shown, the pressure-exerting member and the supply roll of filter material are arranged in fixed positions, and the relative movement occurs as a result of the clockwise rotation of the support core 8.

Figure 5:
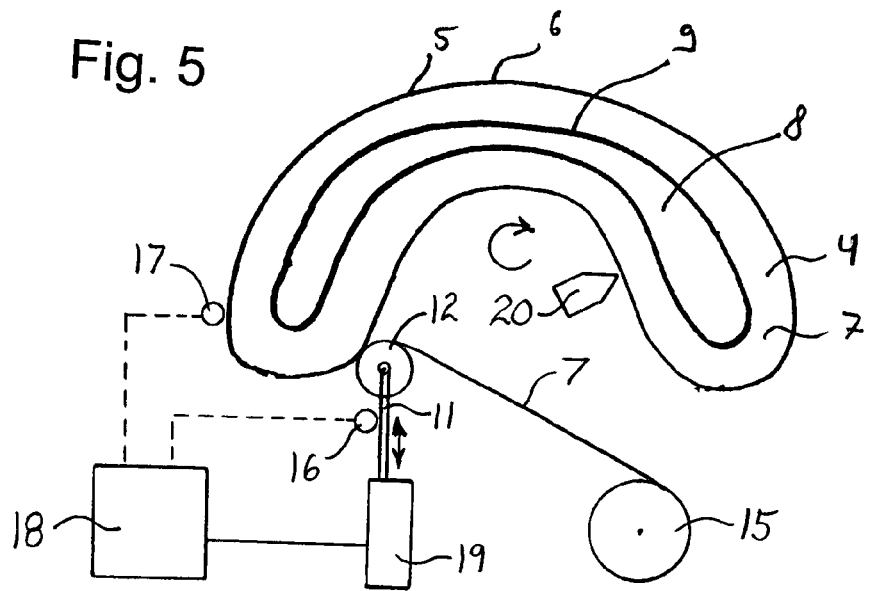
FIG. 5 is a schematic view of an alternative embodiment of the apparatus of the invention in which the position of the pressure-exerting member is controlled by a control unit in response to sensed position and pressure measurements.

In a further embodiment shown in FIG. 5, a plurality of sensors 16 and 17 and a control unit 18 are provided, such that a sensor 16 measures the prevailing contact pressure, and an additional sensor 17 determines the position of the wound filter element from which the contour curve in the region in front of the roller 12 can be determined, so that the control unit 18 can control the movement of the roller 12 and/or the support member 8 via a hydraulic, pneumatic or electromotive drive unit 19 as a function of the measured parameters. One or more tracks of adhesive are applied between the wound layers of filter material 7 from adhesive applicator devices 20.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element wound from a plurality of filter layers, wherein the plurality of wound filter layers of the filter element define a cross-sectional area of the filter element with a circumferential contour having at least one circumferential contour section which undercuts an envelope contour of the cross-sectional filter element area, the at least one circumferential contour section being recessed relative to the envelope contour.

2. A filter element according to claim 1, wherein the envelope contour has a rectilinear envelope contour section.

3. A filter element according to claim 1, wherein the envelope contour is approximately circular or approximately oval.

4. A filter element according to claim 1, wherein the circumferential contour is banana-shaped.

5. A filter element according to claim 1, wherein the envelope contour is a polygon.

6. A filter element according to claim 1, wherein the envelope contour is a polygon with rounded corners.

7. A filter element according to claim 1, wherein the filter element is provided with a support core.

8. A filter element according to claim 1, wherein two adjacent filter layers are glued together.

9. An apparatus for producing a filter element wound from a plurality of filter layers, wherein the filter element has a cross-sectional area with a circumferential contour having at least one circumferential contour section which undercuts an envelope contour of the cross-sectional filter element area, the apparatus comprising a holding device for a support core; a winding device for winding the filter material around the support core, and a pressure-exerting member for pressing the filter material in the at least one circumferential contour section against the support core, beyond the envelope contour, during winding of the filter material around the support core, the at least one circumferential contour section being recessed relative to the envelope contour.

10. An apparatus according to claim 9, wherein further comprising a glue application mechanism.

11. An apparatus according to claim 9, wherein the pressure-exerting member comprises at least one roller element rolling off the top filter layer, respectively.

12. An apparatus according to claim 11, wherein the roller element is biased by a spring.

13. An apparatus according to claim 9, further comprising an active drive for displacing the roller element relative to the support core surface.

14. An apparatus according to claim 13, wherein said active drive is a piston-cylinder unit or an electromotive drive.

15. An apparatus according to claim 13, further comprising a control unit for controlling the active drive.

16. An apparatus according to claim 15, further comprising a sensor for determining the circumferential contour curve of the support core, and wherein the control unit controls the movement of the active drive as a function of the course of the circumferential contour of the support core.

17. A method for producing a filter element wound from a plurality of filter layers, wherein the plurality of wound filter layers of the filter element defines a circumferential contour with a cross-sectional area having at least one circumferential contour section which undercuts an envelope contour of the cross-sectional filter element area, the undercut section being recessed relative to the envelope contour; said method comprising winding the filter layers around a support core, and pressing the filter layers against the support core beyond the envelope contour, at least in the region of the undercutting circumferential contour section during the winding.

18. A method according to claim 17, wherein the filter layers are glued together.

19. A method according to claim 18, wherein the wound filter element is transferred to a shaping shell for curing the adhesive.

20. A method according to claim 17, further comprising removing the support core after at least partial curing of the adhesive.

21. A method according to claim 17, further comprising pressing the filter layers with a relative movement and a contact pressure controlled as a function of an angle of rotation of the support core and a number of executed revolutions.

* * * * *

UNITED STATES PATENT AND TRADEMARK OFFICE
CERTIFICATE OF CORRECTION

PATENT NO. : 7,645,313 B2  Page 1 of 1
APPLICATION NO. : 11/640236
DATED : January 12, 2010
INVENTOR(S) : Lampert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this

Sixteenth Day of November, 2010

David J. Kappos
*Director of the United States Patent and Trademark Office*